Jan. 17, 1950

C. J. MUNTER 2,494,828

GLASSY PHOSPHATE POWDER COMPOSITION
AND PROCESS OF MAKING THE SAME

Filed Feb. 28, 1946

INVENTOR
Casimir J. Munter

Patented Jan. 17, 1950

2,494,828

UNITED STATES PATENT OFFICE 2,494,828

GLASSY PHOSPHATE POWDER COMPOSITION AND PROCESS OF MAKING THE SAME

Casimir J. Munter, Upper St. Clair Township, Allegheny County, Pa., assignor to Hall Laboratories, Inc., a corporation of Pennsylvania Application February 28, 1946, Serial No. 651,016.

16 Claims. (Cl. 252—175)

The present invention relates to a glassy phosphate powder composition and process of making the same.

Phosphate glasses have come into wide use for water conditioning and particularly for water softening, as disclosed for example in the Hall Reissue 19,719. Phosphate glasses, as distinguished from crystalline phosphates, are quite deliquescent and difficult to dissolve. They tend to take up moisture from the air forming a sticky coating on the surfaces of the phosphate particles, causing them to adhere in a compact cake. When the glassy phosphates are put into water to dissolve them, the same sticky adherent layer is formed on the surfaces of the phosphate glass, rendering solution slow in the case of the larger particles and tending to make a powdered glass cohere into a sticky mucilaginous mass which is difficult to dissolve. In fact, it is more difficult to dissolve the powdered material than it is to dissolve the phosphate glass in fair-sized pieces.

These water conditioning phosphates are made by melting an alkali-metal phosphate composition, usually a sodium phosphate composition having the desired ratio of sodium oxide to phosphorus pentoxide, and then rapidly chilling the mass to form a glass, usually by pouring on a cold plate or passing between chilled rolls. The glass plates may be broken into coarse pieces, usually about ⅛ to ¼ of an inch thick and of an average area of about 2 square inches, in which form they may be used for many commercial purposes, such as water softening in boiler plants, etc.

The glass may be ground to a fine powder which has utility for certain purposes where the glass can be mixed with a dispersing agent, such as with soap or dispersed into cheese as a cheese-melting salt. Attempts to use the powdered glass for domestic water softening purposes have, however, resulted in failure because of the virtual impossibility of rapidly dissolving the glass. As stated above, when an attempt is made to mix a powdered phosphate glass with water the particles immediately stick together to form a tacky mass which is very difficult to dissolve even with stirring.

While there has been an insistent demand for a readily soluble phosphate glass water softening powder, so far as I am aware, no such powder has appeared on the market.

Attempts have been made to produce water softening phosphate glass in forms which can be dissolved in water for domestic or industrial water softening purposes, but such attempts have not been entirely satisfactory.

These attempts have been by mechanical treatment of the phosphate glass by putting it either into the form of flakes or agglomerates. The expedient of putting the phosphate glass info the form of flakes is disclosed in the Zinn Patent 1,979,926, the product of which has gone into extensive commercial use. As disclosed in the Zinn patent, the phosphate glass is passed between rapidly rotating rolls which roll the molten glass into a very thin sheet of the order of one-thousandth to one-hundredth of an inch in thickness, which is broken up into flakes. These flakes may or may not be adjusted by the addition thereto of alkali-metal salts, suih as trisodium orthophosphate and sodium carbonate. The flakes, because of their substantial thickness and area, require time for dissolving. When a handful of flakes is dropped in a basin of water it will fall to the bottom of the basin and tend to form a sticky mass, which must be stirred into the water to dissolve it. When an attempt is made to stir by means of the hand, such as in the wash basin or bath tub, the sharp flaky particles may lacerate the skin. This is a common cause of complaint from domestic users of flakes. The flakes have the surface deliquescent properties of the original glass and require shipment and shelf storage in moisture-proof containers. Moreover, the process of making the flakes is expensive and difficult to control.

Another attempt at mechanical treatment to produce a more readily soluble form of phosphate glass is disclosed in the Hubbard and McCullough Patent 2,244,158. According to this patent the phosphate glass is powdered and the surfaces of the powdered particles are coated with sticky films either by exposing them to water vapor or coating the particles with a sticky material. The sticky particles are then agglomerated, either with or without the addition of alkaline- or acid-adjusting salts, to form distinct granules containing a large number of particles per granule. These granules are stated in the patent to disintegrate into individual particles and dissolve when dropped into a sufficient depth of water. However, when a handful of the granules is thrown into a basin of water or is placed in the bottom of a container and the water poured on to it, which are the usual ways of adding a water softening compound to water, the granules form upon the bottom of the basin or container a sticky mass which is difficult to dissolve even with stirring. Even when the granules are sprinkled into water, as described in the Hubbard and McCullough patent, an appreciable time for dissolving is required because the water must first penetrate the granules and dissolve the bonds between the particles before the particles are released to be individually dissolved in the water. After these bonds are separated there is still a tendency for the individual particles to stick together and form a difficultly soluble tacky mass, particularly where a quantity of the material is dumped into the water or initially placed upon the bottom of the container. The granules, like the original phosphate powder from which they are made, tend to absorb moisture from the atmosphere and require storage in moisture-proof packages.

I have produced a powdered phosphate glass composition which is much more rapidly soluble than phosphate compositions heretofore produced. As distinguished from the mechanical attempts, such as by flaking or agglomerating, I produce much more rapid solubility by chemical means. As hereinafter more specifically described, I treat the individual particles of the phosphate glass so as to form thereon a surface coating or case of an acid reversion product of the glass, and mix the particles so treated with a substance which reacts with the acid reversion product to release a gas when placed in water. The surface layer or case of the reversion product markedly reduces the tendency of the particles to adhere or clump together and the gas which is released tends to drive the individual particles apart and to suspend them in the water so that rapid solution is attained without even stirring when the phosphate is added to water in the usual ways.

The surface coating or case of reversion product upon the individual particles tends to cut down absorption of moisture from the atmosphere and gives better shelf life, particularly when packaged in non-waterproof paper cartons.

The material made in accordance with my process when marketed in loose powder form has decided free-flowing characteristics as contrasted with the untreated powdered phosphate glass which is not free-flowing.

The bulk of the material may also be controlled. A powder having large volume per unit weight is desirable for certain purposes.

I will now specifically describe my preferred material and the preferred process of producing it.

The glassy phosphate which I prefer to use is a sodium phosphate glass containing approximately 67% $P_2O_5$ and having a ratio of $Na_2O$ to $P_2O_5$ of about 1.12 to 1. This sodium phosphate glass is made in the usual way by forming a melt and quickly chilling the melt to form the glass. The glass is then crushed and ground to form a fine powder, preferably to pass a 60 mesh per inch screen or finer.

The powder is then processed in an apparatus, the preferred form of which is illustrated in the drawings, in which.

Figure 2:
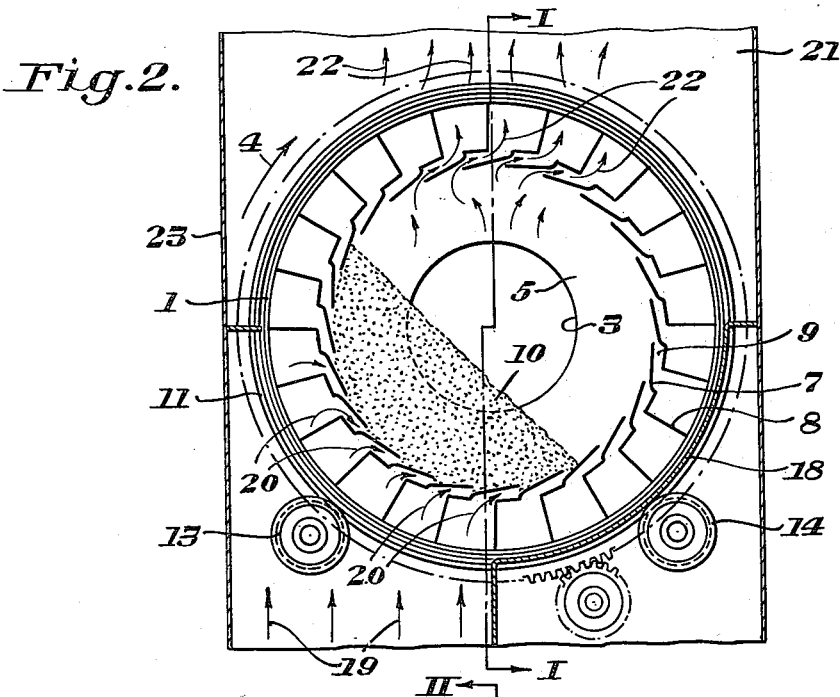
Fig. 2 is a section along the line II—II of Fig. 1.
Figure 1:
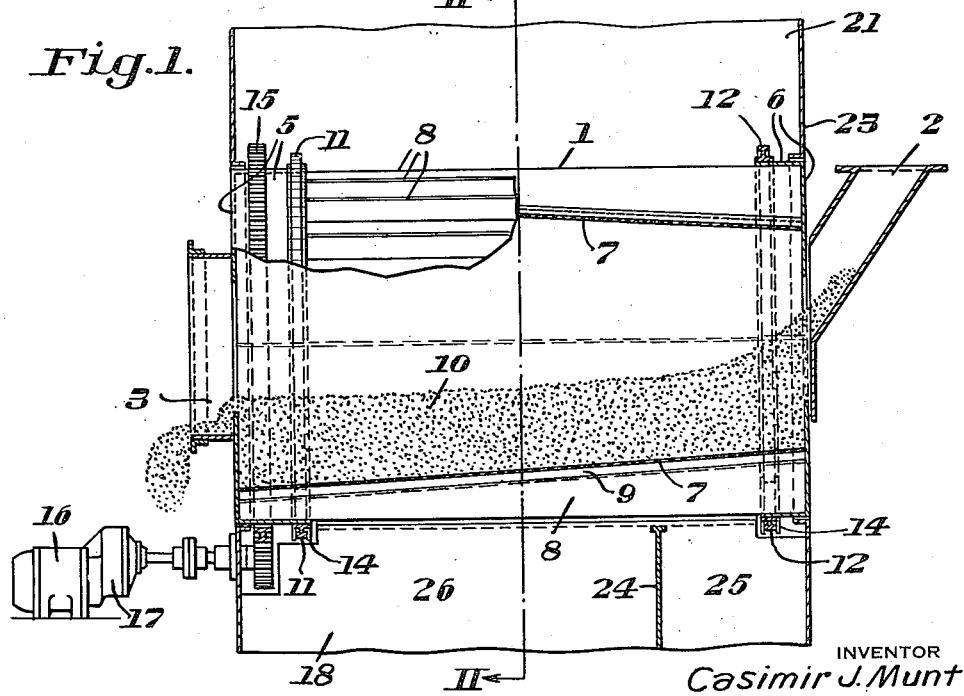
Fig. 1 is a side elevation partly in section along the line I—I of Fig. 2.

As shown in the drawings, the powder to be processed is passed through a rotating louvre reactor drum indicated generally by reference numeral 1. The powder is fed into the inlet 2 and discharged from the outlet 3. The drum is rotated in the direction indicated by the arrow 4 at the top of Fig. 2. The drum has end frames 5 and 6 which support between them plates 7 having strengthening fins 8. The plates are inclined and overlapped to leave openings or louvres 9 between them through which heated gases may be discharged to pass through the mass of powder indicated at 10. The plates are also arranged around a frustum of a cone, as shown in Fig. 1, so as to feed the material from right to left as viewed in Fig. 1. The end frames 5 and 6 are provided with circular tracks 11 and 12, respectively, each of which is carried on a pair of trunnions 13 and 14 to support the drum. The drum is driven through a ring gear 15 by means of an electric motor 16 through a reduction gearing 17. A baffle 18 is provided below the right-hand half of the drum, as shown in Fig. 2, so as to direct the heated gases, the upward flow of which is indicated by the arrows 19, through the side of the drum in which the mass of powder is principally located because of the rotation of the drum. The rising gases pass through the louvres 9, as indicated by the arrows 20, and through the mass of powder 10, and escape through the louvres at the upper side of the drum and pass upwardly through the stack or chimney 21, as indicated by the arrows 22. The chimney 21 forms the upper part of the casing, indicated generally by reference numeral 23, which surrounds the drum. Below the drum the casing is divided by a movable partition 24 into two passages 25 and 26. The passage 25 supplies air containing a regulated amount of moisture through the drum adjacent its inlet end and the passage 26 supplies hot dry air through the drum adjacent its outlet end.

The size of the apparatus may be varied, depending upon the capacity desired. In a typical installation the reactor drum 1 is about 3 feet in diameter and about 10 feet in length. In the illustrated apparatus, assuming that the drum has a length of about 10 feet, about 3 feet may be used for the humidifying zone over the passage 25 and about 7 feet for the heating zone over the passage 26. The length of these zones can be readily adjusted by shifting the partition 24. The phosphate glass may be fed through the drum at varying rates depending upon the excess amount of moisture supplied and evaporated and upon the extent of the surface reversion of the powder desired, as hereinafter more particularly described. A typical rate of feed for a drum of the size above indicated is about 1000 pounds per hour, at which rate of feed it takes about 1 hour for the powder to pass through the drum in a continuous operation.

The powdered phosphate glass ground to pass an 80 mesh screen is mixed with approximately 5 parts of sodium bicarbonate and 5 parts of sodium carbonate, both ground to pass a 100 mesh screen, to 100 parts by weight of the powdered glass. This mixture is fed at a controlled rate into the inlet 2 of the reactor drum 1. It is first subjected to the current of warm humidified air. The louvres 9 cause the passage of the humidified air uniformly through the mass of powder in the drum as it is rotated. The air in the passage 25 is warmed to a temperature of approximately 60° C. and is humidified with steam to approximately 90% relative humidity at that temperature. The powder, however, leaves the humidifying zone, which is above the flue 25, at a temperature considerably below that of the warmed air, being about 40 or 45° C. The rate of feed, the rotation of the drum and the current of air are adjusted so that the powder picks up about 4% of its weight of moisture. This moisture humidifies or hydrates the surfaces of the particles of phosphate glass but the temperature of the powdered glass is not high enough so that there is any substantial reversion of the phosphate glass to an acid reversion product.

The powder having the surfaces of its particles thus hydrated passes into a drying zone over the hot air flue 26 and air at a temperature of approximately 150° C. and substantially free of moisture is passed through the drum. The rate of air flow is so adjusted that the powder as discharged from the drier has a temperature of approximately 100° C. As the powder first passes into the hot air zone the hot dry air begins to remove some of the moisture and to increase the temperature of the powder. This process continues until the powder is discharged from the outlet 3 at a temperature of approximately 100° C. and containing about ¾ of 1% by weight of what I term "water of reversion."

The product as discharged is screened to remove any material over 80 mesh. Usually over 90% of the product passes through an 80 mesh per inch screen. This powdered product is then ready for packaging. The coarser material which is screened out is put into the grinder along with the raw phosphate glass and reprocessed.

While in the preferred procedure as specifically described above the gas-releasing substances are mixed with the powder prior to processing, the gas-releasing substances may be mixed with the powder after processing. Therefore in the claims when I speak of mixing the gas-releasing substances with the phosphate glass powder I do not intend to be limited to any particular order of these steps unless so indicated.

While in the preferred composition described above a mixture of sodium bicarbonate and sodium carbonate is employed as the gas-releasing substance, other gas-releasing substances may be employed which will react with the acid reversion product. For example, sodium bisulphite or sodium sulphite may be employed since they both react with the acid reversion product to release a gas, in this case sulphur dioxide. Where the material to be put in solution is employed for boiler water conditioning, such gas-producing substances may be advantageously used where it is desired to add sodium bisulphite or sodium sulphite to the boiler water.

The gas-producing substance may be added alone or in combination with other substances. For example, sodium carbonate or bicarbonate may be added admixed with some material such as trisodium phosphate for adjusting the pH value of the solution in which the glass is to be ultimately dissolved. Another form in which the gas-producing substance may be added is in combination with unreverted phosphate glass particles. Powdered phosphate glass may be hydrated or moistened at a low temperature and have mixed with it finely powdered sodium carbonate or bicarbonate which will coat the particles of the phosphate glass. Upon drying the coated glass at a low temperature, a product is produced which consists of dry phosphate glass having its particles coated with the gas-producing substance. The phosphate glass thus coated with the carbonate or bicarbonate may be mixed with phosphate glass the surfaces of which have been reverted to an acidic reversion product, to furnish the material which reacts with the acidic reversion product to release a gas when the mixture is added to water.

The chemical reactions which take place in the reactor drum are believed to be as follows. When the powdered phosphate glass is subjected to the humidified air, the surfaces of the phosphate glass particles are moistened or hydrated to the extent of about 4% by weight of water to the weight of the phosphate glass. At this point there is no appreciable chemical reaction between the water and the phosphate glass. However, the sticky hydrated surfaces of the phosphate glass tend to pick up and become partially coated with the sodium bicarbonate and carbonate. Not all of the sodium bicarbonate and sodium carbonate adheres to the particles, some passing along as a loose powder.

As this powder passes into the heating zone, the hot dry air progressively eliminates the greater part of the added moisture and simultaneously raises the temperature of the powder until a point is reached where the remaining water reacts with the phosphate glass particles to form surface coatings of acid reversion product.

Due to the uniform circulation of the humidified air and also of the dried air through the bed of powdered material, the individual particles are subjected to uniform hydration and heating so that the chemical effects upon the particles are uniform throughout the mass.

The phosphate glasses may be regarded as molecularly dehydrated phosphates sinces they can be produced by the removal of water of molecular constitution (as distinguished from water of crystallization) from the orthophosphates. See Hall and Jackson Patent 1,903,041, particularly pages 3 and 4. For example, if dihydrogen monosodium orthophosphate is heated to the melting temperature, water of molecular constitution is driven off and it is converted by quick cooling into sodium phosphate glass of the nominal sodium metaphasphate composition according to the following formula: $NaH_2PO_4 \rightarrow NaPO_3 + H_2O$. This reaction is reversible and if the sodium phosphate glass is subjected to water at a sufficiently high temperature the glass takes up water of constitution and is converted into an acid reversion product. The degree of reversion depends upon the temperature, time, and the amount of water available to enter into the reaction. If the reaction is carried to its ultimate, the glass reverts to the dihydrogen monosodium orthophosphate, which is distinctly acid according to the following equation: $NaPO_3 + H_2O \rightarrow NaH_2PO_4$. However, under most operating conditions the reversion is mainly to the acid dihydrogen disodium pyrophosphate, together with other reversion products intermediate in rehydration between metaphosphate and pyrophosphate. The reversion of metaphosphate to dihydrogen disodium pyrophosphate can be represented by the equation

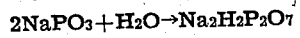

$$2NaPO_3 + H_2O \rightarrow Na_2H_2P_2O_7$$

The intermediate reversion products are formed by taking up water of constitution to a lesser degree than in the formation of the pyrophosphate. There is probably a series of these intermediate reversion products which it is difficult, if not impossible, to indicate by exact chemical formulae, since they are largely glasses. When an alkali metal metaphosphate glass is subjected to heat and moisture, it takes up water of constitution to form an acid reversion product. The hydrogen of the water of constitution which is taken up appears as acid hydrogen, thereby rendering the reversion product acidic. The amount of acidity depends upon the amount of water of constitution taken up, being greatest in the reversion to the orthophosphate, somewhat less in the reversion to the acid pyrophosphate, and still less in the acid reversion products intermediate between the original metaphosphate glass and the acid pyrophosphate. Glasses having ratios of $Na_2O$ to $P_2O_5$ or other alkali-metal oxide to $P_2O_5$ greater than or less than 1 to 1 similarly revert to acidic reversion products.

Assuming an operating condition as above described in which about 4% by weight of water is introduced into the powder in the hydrating reacting zone: This water is absorbed by the surfaces of the glass particles, apparently forming a somewhat sticky layer. The temperature of the humidified air is kept below a point at which there is any significant reversion of the glass to an acid reversion product. This is important because if a reversion reaction should here occur, an excessive amount of reversion product would be produced. Also the excess moisture would act as a solvent and permit the acid reversion product to react with and exhaust the added gas-producing substances.

As the phosphate glass carrying the surface moisture added in the hydrating zone passes into the heating zone, the first action of the hot air is to begin the removal of excess moisture and to begin the heating of the phosphate glass. This should be controlled so that the excess moisture beyond that desired for producing the acid reversion product is removed before the mass has reached a temperature to cause effective reversion to take place. By thus controlling the removal of moisture and the rise in temperature, the desired amount of reversion product is assured and a premature reaction between the acid reversion product and the gas-producing substance is prevented because by the time that the powder is raised to the proper reversion temperature the amount of water is so reduced that it does not have an appreciable solvent effect upon the gas-producing substances.

Heating by passing a gas such as air through a mass of powder, or by passing dispersed powder through a heated gas such as air, is the most effective way known to me of securing a uniform reaction throughout the powder, which is important. Where the reaction is uniform throughout the mass of powder, most if not all of the particles are coated by acid reversion product, which insures that each such particle when added to water has its own encasing film of dispersing gas which tends to separate it from other particles and to keep it suspended.

While in the preferred apparatus I provide two currents of air, one for humidifying at a relatively low temperature and one for reacting at a higher temperature, it is possible to employ a single current of air, although such operation is harder to control. In such case the air is supplied with sufficient humidity to moisten the particles near the inlet end of the drum and hot enough to cause the reversion reaction at the outlet end of the drum. In such case the powder comes into the drum at room temperature and absorbs moisture before it becomes heated to any substantial extent. Following such moisture absorption, the excess moisture is evaporated and the absorption of heat required for evaporation tends to keep down the temperature of the powder until the excess moisture is driven off, after which the temperature is raised to the reversion point. When a single current of air is used, in general lower temperatures and lower humidities are employed.

Where gas heating is employed, moisture should be added somewhat in excess of that required for producing the reversion product. The amount of excess moisture can be regulated to adjust the bulking characteristics of the powder. The addition and removal of moisture from the surfaces of the particles of the glass apparently changes their surface characteristics, so that the processed powder has a greater bulk than the original powdered phosphate glass. By "bulk" I mean the volume occupied by the powder for a given weight. The bulk may be increased by using more water for the surface hydration of the glass particles. It may be varied so that the product will have a bulk but very little greater than that of the original powder for a minimum of water up to a bulk two or three times that of the original powder. The original unprocessed powdered glass has a bulk of about 25 cubic inches per pound. In the above example, adding about 4% of moisture, the bulk may be increased to about 52 cubic inches per pound, about double that of the unprocessed powdered glass. A bulk of the order of 50 cubic inches per pound is desirable for most purposes. However, certain advantages may be obtained with a bulk of at least 35 cubic inches per pound up to about 60 cubic inches per pound. For some purposes it is desired to have a high bulk and the process is carried out so as to produce the particular bulk desired. In general, an increase in the bulk tends to increase the free-flowing characteristics of the powder.

The free-flowing characteristics of the powder, however, are more directly connected with the amount of reversion product produced. The original powdered glass is not free-flowing and in this characteristic alone is ill-adapted for packaging and dispensing. For packaging and dispensing it is highly desirable that the powder be free-flowing. There is apparently a direct relationship, within certain limits, between the amount of reversion product on the surfaces of the particles and the free-flowing qualities of the product. The material produced in the above typical example contains in the final product about ¾ of 1% of water of reversion and is very free-flowing. The amount of water of reversion may be varied. I have found in general that there should be at least about ¼ of 1% of water of reversion to impart satisfactory free-flowing characteristics. The presence of ¾ of 1% of water of reversion produces satisfactory free-flowing qualities and there is no particular use in increasing the amount of reversion product so far as the free-flowing qualities are concerned. However, the amount of reversion product may be increased if an acidic product is desired or if the initial glass is an alkaline glass and requires more acid reversion product for satisfactory rate of solution.

The acid product has somewhat less calcium-sequestering properties than the original glass. It is therefore desirable not to produce a greater amount of reversion product than is necessary to secure the desired free-flowing properties and to produce the desired amount of gas for dispersion purposes. In my process an accurate control of these various factors can be readily attained.

The powder has improved non-caking and moisture-resisting properties. When the particles are coated with sufficient reversion product to produce a good free-flowing powder, the powder is quite resistant to the absorption of moisture. I believe that this is because the reversion product has much less tendency to take up water from the atmosphere than the original glass. The surface reversion product may vary from what appears to be a predominantly glassy constitution, to a microcrystalline or even crystalline form, all of which forms appear to be more resistant to water absorption than the original glass. Moreover, if such powder is subjected to particularly moist conditions a cake may be formed which, however, is readily friable and rapidly disintegrates in water even if not broken up.

The bulking, free-flowing and resistance to absorption of atmospheric moisture are characteristic of the powder having its particles coated with an acidic reversion product of the phosphate glass independently of the addition of the gas-releasing substance. Therefore, if it is desired to produce a powder having some or all of these characteristics where rapid solubility is not an essential, the addition of the gas-releasing substance may be dispensed with.

The amount of reversion product may be controlled by controlling the amount of water introduced for hydration and the heating cycle. If more acid reversion product is desired, the amount of water of hydration is increased. The amount of acid reversion product can be increased by quickly heating the powder before the heating gas (air) has a chance to remove much moisture before bringing the powder to the reversion reacting temperature. These factors can be controlled in the apparatus illustrated. For example, the amount of moisture added can be varied by controlling the amount of steam supplied to the air in the humidifying zone. The rapidity of reaction may be speeded up by increasing the temperature of the heating air in the heating zone. If hotter air is employed, the reversion reaction can be made to take place without great removal of moisture resulting in more reversion product, whereas if the temperature of the air is lower, more moisture is removed before the reversion reaction takes place resulting in less reversion product.

In order to get effective reversion for rapid solubility and free-flowing characteristics, the powder, while still containing the desired amount of water for reversion purposes, should be heated to a temperature of at least 70° C. in commercial practice, although for rapid production the powder had best be heated to 90 to 100° C. to insure a more rapid reaction. However, with increasing temperature the reversion reaction is markedly accelerated and the temperature of the powder should not be carried above about 150° C. The temperature of the air may be varied within fairly wide limits depending upon the desired final temperature of the powder and upon the mass of the powder and the rate of feed. In operating practice the temperature may vary from 100° C. with a slow rate of feed, up to even as high as 500° C. for rapid feed and a large mass of powder.

While the temperature in the reacting zone must be raised to a point where the reversion takes place, the temperature in the humidifying zone should be limited so that premature reversion does not take place. The powder leaves the humidifying zone at a temperature not above about 60°, preferably not more than about 40 or 50°. The temperature of the humidifying air may vary from room temperature up to even as high as 150° for a short period of contact without raising the powder to the reversion point.

The rapidity of dissolving when the powder is dropped into the water or water is poured upon the powder, as in the usual domestic or industrial use of a water-softening powder, depends within limits upon the amount of acid reversion product, first because the coating or case of acid reversion product prevents the particles from clumping, and second because the acid reversion product reacts with the added gas-producing substance to produce a dispersing gas. In order to get effective rapidity of solution, an amount of acid reversion product corresponding to the addition of at least about .05% water by weight is required, although it is better to have at least .1% water of reversion. The preferred range for the water of reversion is from about .25 to 1.0%. By adjusting the amount of acid reversion product the time of dissolving can be controlled. In general, the greater the amount of reversion product the more rapid the rate of solution, because of the greater evolution of gas, assuming, of course, that there is ample gas-releasing substance present. In a powder for general water-softening conditions, such as for domestic use, water of reversion of the order of about ¾ of 1% is quite satisfactory. It is preferable in the treatment of most glasses not to increase the water of reversion above about 1% because the reversion product tends to cut down the calcium-sequestering effectiveness of the phosphate glass. If the water of reversion is increased above about 2.5%, enough reversion product is produced to markedly decrease the water-softening effectiveness of the glass.

The amount of water which is added for initial hydration may vary from about ½ of 1% up to as high as about 6% by weight of the phosphate glass.

The amount of gas-producing material may be varied from the stoichiometrical amount required to react with the surface acidic reversion product up to a considerable excess. Where it is desired to adjust the alkalinity of the powder, as in the specific example quoted above, enough of the gas-producing substance (sodium carbonate and sodium bicarbonate) may be added to give the desired pH value. In general, the amount of added gas-producing material will vary from 1 or 2% up to say 10 or 20% by weight.

While I prefer to add moisture to the phosphate glass powder by means of a humidified gas (air), the moisture may be otherwise added so long as it is uniformly disseminated through the powder. One method is by mixing with the powder a hydrated salt which will yield moisture. For example, sodium sulphate decahydrate may be added to the phosphate glass powder and mixed in a mechanical mixer. The heat generated during mechanical mixing will cause the sodium sulphate decahydrate to give up its water to the phosphate glass. Other hydrated salts which may be employed are sodium carbonate decahydrate, and disodium orthophosphate dodecahydrate. Salts which require higher temperatures to release their water may be employed, such as trisodium orthophosphate dodecahydrate and sodium tetraborate decahydrate. The use of hydrated salts is a convenient method of insuring uniform distribution of the water throughout the mass and an accurate control of the added water. After the glass has thus been hydrated it is heated first to drive out the excess moisture and thereafter to cause the reversion reaction with the remaining water. Still other methods may be employed for adding water, such for example as moistening the glass with a mixture of water and volatile solvent, such for example as a 10% solution of water in acetone. The use of such solution insures even distribution of the water and the volatile solvent may be then driven off.

While I prefer to carry out the reaction which produces the acid reversion product in a reactor drum by means of heated air passed through the mass of powder, the reaction may be otherwise carried out. For example, the powder may be dropped in dispersed form through a body of heated air or the powder may be spread on porous trays and the heated air passed through it. It is important that the heating and the reversion reaction take place uniformly throughout the mass of powder.

While I prefer to package and market my processed powder in loose form, the particles of which are for the most part discrete because I have found that such loose powder has a maximum rate of solution and also because of its free-flowing and bulking qualities, there may be situations where, to meet particular requirements, it will be desirable to put the powder into flakes, cakes or agglomerates. A notable feature of my invention is that, even if the powder is formed into flakes, cakes or agglomerates, it still possesses a far more rapid rate of solution than flakes and agglomerates heretofore made. Flakes and cakes may be made by slightly moistening the processed powder, lightly compressing it as by rolling, and drying at a temperature below the reversion temperature. Agglomerates may be made by slightly moistening the processed powder, tumbling the processed powder to form agglomerates, and drying at temperatures below the reversion temperature. Flakes and agglomerates may also be made by moistening the unprocessed powder containing the gas-releasing material and making it into flakes and agglomerates, driving out the excess water, and thereafter heating to a temperature to produce the acid reversion product. Such flakes or agglomerates are friable and rapidly disintegrate on contact with the water due to the dispersing effect of the released gas.

The glasses which I preferably employ are those most commonly used for water conditioning purposes. Such glasses usually fall within the range of molar ratios between alkali-metal oxide and phosphorus pentoxide of 1 to 1 and 1.5 to 1. Glasses in this range are readily preparable (see Hall Reissue 19,719, particularly page 2, first column). Glasses having a molar ratio of alkali-metal oxide to phosphorus pentoxide of more than 1.5 to 1 may be employed, although they are somewhat more difficult to produce because of the tendency of the melt to crystallize on cooling. The practicable maximum ratio for the production of a glass appears to be in the neighborhood of 1.7 to 1 because of the extremely drastic quenching required to produce a glass. It is also possible to use glasses in which the molar ratio of alkali-metal oxide to phosphorus pentoxide is somewhat less than 1. However, as such ratio decreases, the glasses become increasingly acid and increasingly difficult to dissolve. A ratio of alkali-metal oxide to phosphorus pentoxide of about .9 to 1 appears to be about the practicable minimum ratio.

While sodium phosphate glasses are preferred, other alkali-metal phosphate glasses may be employed, such as those of potassium, lithium, rubidium and ammonium, or fused or mechanical mixtures of such glasses, such for example as a fused sodium-potassium phosphate glass. For purposes of this case I include ammonium as an alkali-metal.

The alkali-metal phosphate glasses may contain the usual impurities. For example, most commercial forms of phosphate glass contain a small amount of water of constitution, generally from about ½ to 1%. The glasses may contain other impurities or added substances, such for example as small amounts of boric oxide, silica, calcium oxide, magnesium oxide, etc. Various adjusting agents, either acid or alkaline, may be mixed with the powdered glass to impart the desired pH value to the water in which it is ultimately dissolved.

A wide variety of tests show a remarkable improvement in the rapidity of dissolving over other forms of phosphate glass which have been used or suggested. The housewife usually dumps a quantity of a water softener into the wash basin or wash tub so that the best test should simulate actual conditions. I have developed such a standardized test for comparing various water softening compositions. In this test 10 grams of the material to be tested is dumped from a small beaker held at a height of 1 to 2 inches above the water level into 1 gallon of water in a standard glass specimen jar 9¾ inches in diameter and 6 inches in height. One gallon of water gives a depth of 4 inches in the jar. Material is dumped in one mass by a quick turning of the beaker. The water should be free of currents and should be at 40° C. The material is allowed to dissolve without stirring. The time of dissolving is the time elapsed from the moment of dumping the material into the water until the material has completely dissolved. The following tabulation shows the relative times of dissolving:

Material:         Time of dissolving (minutes)
   Powdered sodium phosphate glass of 1.12 to 1 ratio of $Na_2O$ to $P_2O_5$ (to pass 80 mesh) _____ 56
   Sodium phosphate glass flakes of 1.12 to 1 ratio of $Na_2O$ to $P_2O_5$ (Zinn Patent No. 1,979,926) _____ 12
   Sodium phosphate glass agglomerates of 1.12 to 1 ratio of $Na_2O$ to $P_2O_5$ (Hubbard and McCullough Patent No. 2,244,158) _____ 15
   Sodium phosphate glass powder of 1.12 to 1 ratio of $Na_2O$ to $P_2O_5$ processed in accordance with the specific example recited above_____ .25

The unprocessed powdered sodium phosphate glass fell to the bottom of the jar and formed a gummy mass which dissolved slowly. The flakes also fell to the bottom of the jar and formed a gummy mass which, however, dissolved about four times as fast as the plain powdered glass. The agglomerates likewise fell to the bottom of the jar and formed a gummy mass which dissolved at about the same rate as the flakes. When the powder processed in accordance with my invention was dumped into the water, gas was released as soon as the powder came in contact with the water so that there was evolution gas and a dispersal of the particles during the descent of the powder through the water. Some of the powder reached the bottom of the jar but the particles thereof were immediately floated by the generation of gas bubbles and quickly dissolved.

While my processed powder dissolves rapidly in quiet water, the rate of solution may be speeded up by stirring. When stirred it dissolves very much more rapidly than do the flakes or agglomerates. When my processed material is sprinkled into water, the sprinkled material goes into solution almost instantaneously and the powder particles do not descend more than an inch or so before they are completely dissolved.

As indicated above, the time of dissolving can be varied by varying the amount of acid reversion product formed on the glass particles. The time of dissolving can be decreased somewhat below that shown in the above table by increasing the amount of reversion product. There is, however, no need for getting a faster time of solution and increasing the reversion product tends to cut down the calcium sequestering property of the glass. By processing the powder so that less reversion product is formed than in the specific example set forth herein, the time of dissolving may be lengthened in the above-described test to a matter of a few minutes. However, for a satisfactory product the material should completely dissolve in not more than four minutes in the above test.

While I have specifically described the preferred embodiment of my invention, it is to be understood that the invention is not so limited but may be otherwise embodied and practiced within the scope of the following claims.

I claim:

1. A water treating composition consisting essentially of a powdered, water-soluble alkali-metal phosphate glass having a molar ratio of alkali-metal to phosphorus pentoxide between about 0.9:1 and about 1.7:1, the particles of said glass having on their surfaces an acidic reversion product of the character obtainable by subjecting the glass to air containing approximately 90 per cent relative humidity at a temperature of approximately 60° C. until an amount of moisture equivalent in weight to about 4 per cent of the weight of the phosphate glass has been absorbed thereon, and then partially dehydrating the partially hydrated particles by subjecting them to substantially moisture-free air at a temperature of about 100° C. to about 150° C. until the moisture remaining constitutes from about 0.75 per cent to about 1.0 per cent of the weight of the particles, and a powdered, solid, water-soluble alkali-metal compound which releases a gas when reacted in water solutions with said treated phosphate glass, said water treating composition being characterized by a high rate of solution in water.

2. A water treating composition consisting essentially of a sodium phosphate glass having a molar ratio of sodium oxide to phosphorus pentoxide between about 0.9:1 and about 1.7:1, the particles of said glass having on their surfaces an acidic reversion product of the character obtainable by subjecting the glass to moist air at a temperature of from about 20° C. to about 150° C. until an amount of moisture equivalent in weight to about 0.5 to about 6.0 per cent of the weight of the phosphate glass has been absorbed thereon, and then partially dehydrating the partially hydrated particles by subjecting them to substantially moisture-free air at a temperature of about 100° C. to about 150° C. until the moisture remaining constitutes from about 0.05 to about 2.5 per cent of the weight of the particles, and a powdered carbonate of sodium which releases a gas when reacted in water solutions with said treated phosphate glass, said water treating composition being characterized by a high rate of solution in water.

3. A water treating composition consisting essentially of a sodium phosphate glass having a molar ratio of sodium oxide to phosphorus pentoxide between about 0.9:1 and about 1.7:1, the particles of said glass having on their surfaces an acidic reversion product of the character obtainable by subjecting the glass to moist air at a temperature of from about 20° C. to about 150° C. until an amount of moisture equivalent in weight to about 0.5 to about 6.0 per cent of the weight of the phosphate glass has been absorbed thereon, and then partially dehydrating the partially hydrated particles by subjecting them to substantially moisture-free air at a temperature of about 100° C. to about 150° C. until the moisture remaining constitutes from about 0.05 to about 2.5 per cent of the weight of the particles, and a powdered sulfite of sodium which releases a gas when reacted in water solutions with said treated phosphate glass, said water treating composition being characterized by a high rate of solution in water.

4. A water treating composition consisting essentially of a powdered, water-soluble alkali-metal phosphate glass having a molar ratio of alkali-metal to phosphorus pentoxide between about 0.9:1 and about 1.7:1, the particles of said glass having on their surfaces an acidic reversion product of the character obtainable by subjecting the glass to moist air at a temperature of from about 20° C. to about 150° C. until an amount of moisture equivalent in weight to about 0.5 to about 6.0 per cent of the weight of the phosphate glass has been absorbed thereon, and then partially dehydrating the partially hydrated particles by subjecting them to substantially moisture-free air at a temperature of about 100° C. to about 150° C. until the moisture remaining constitutes from about 0.05 to about 2.5 per cent of the weight of the particles, and a powdered, solid, water-soluble alkali-metal compound which releases a gas when reacted in water solutions with said treated phosphate glass, said water treating composition being characterized by a high rate of solution in water.

5. The process of treating a powdered, water-soluble, alkali-metal phosphate glass having a molar ratio of alkali-metal oxide to phosphorus pentoxide between about 0.9:1 and about 1.7:1 to produce a water treating composition having a high rate of solution in water, which comprises subjecting the said alkali-metal phosphate glass to moist air at a temperature of from about 20° C. to about 150° C. for such a time that there is accumulated upon the alkali-metal phosphate glass from about 0.5 to about 6.0 per cent of water by weight, subjecting the alkali-metal phosphate glass to air substantially free of moisture at a temperature within the range of from about 70° C. to about 500° C. for such a period of time that the alkali-metal phosphate glass contains from about 0.05 to about 2.5 per cent by weight of moisture, and mixing with the said alkali-metal phosphate glass a powdered solid water-soluble alkali-metal compound which releases a gas when the resultant mixture is added to water.

6. The process of treating a powdered, water-soluble, alkali-metal phosphate glass having a molar ratio of alkali-metal oxide to phosphorus pentoxide between about 0.9:1 and about 1.7:1 to produce a water treating composition having a high rate of solution in water, which comprises subjecting the said alkali-metal phosphate glass to air containing approximately 90 per cent relative humidity at a temperature of about 60° C. for such a time that there is accumulated upon the alkali-metal phosphate glass from about 0.5 to about 6.0 per cent of water by weight, subjecting the alkali-metal phosphate glass to air substantially free of moisture at a temperature within the range of from about 70° C. to about 500° C. for such a period of time that the alkali-metal phosphate glass contains from about 0.05 to about 2.5 per cent by weight of moisture, and mixing with the said alkali-metal phosphate glass a powdered solid water-soluble alkali-metal compound which releases a gas when the resultant mixture is added to water.

7. The process of treating a powdered, water-soluble, alkali-metal phosphate glass having a molar ratio of alkali-metal oxide to phosphorus pentoxide between about 0.9:1 and about 1.7:1 to produce a water treating composition having a high rate of solution in water, which comprises hydrating the surfaces of the alkali-metal phosphate glass at a temperature of from about 20° C. to about 150° C. for such a time that there is accumulated upon the alkali-metal phosphate glass from about 0.5 to about 6.0 per cent of water by weight, subjecting the alkali-metal phosphate glass to air substantially free of moisture at a temperature within the range of from about 70° C. to about 500° C. for such a period of time that the alkali-metal phosphate glass contains from about 0.05 to about 2.5 per cent by weight of moisture, and mixing with the said alkali-metal phosphate glass a powdered solid water-soluble alkali-metal compound which releases a gas when the resultant mixture is added to water.

8. The process of treating a powdered, water-soluble, alkali-metal phosphate glass having a molar ratio of alkali-metal oxide to phosphorus pentoxide between about 0.9:1 and about 1.7:1 to produce a water treating composition having a high rate of solution in water, which comprises subjecting the said alkali-metal phosphate glass to air containing approximately 90 per cent relative humidity at a temperature of about 60° C. for such a time that there is accumulated upon the alkali-metal phosphate glass from about 0.5 to about 6.0 per cent of water by weight, subjecting the alkali-metal phosphate glass to air substantially free of moisture at a temperature within the range of from about 70° C. to about 500° C. for such a period of time that the alkali-metal phosphate glass contains from about 0.75 to about 1.0 per cent by weight of moisture, and mixing with the said alkali-metal phosphate glass a powdered solid water-soluble alkali-metal compound which releases a gas when the resultant mixture is added to water.

9. A water treating composition consisting essentially of a powdered, water-soluble alkali-metal phosphate glass having a molar ratio of alkali-metal to phosphorus pentoxide between about 0.9:1 and about 1.7:1, the particles of said glass having on their surfaces an acidic reversion product of the character obtainable by hydrating the surfaces of the alkali-metal phosphate at a temperature of approximately 60° C. until an amount of moisture equivalent in weight to about 4 per cent of the weight of the phosphate glass has been absorbed thereon, and then partially dehydrating the partially hydrated particles by subjecting them to substantially moisture-free air at a temperature of about 100° C. to about 150° C. until the moisture remaining constitutes from about 0.75 per cent to about 1.0 per cent of the weight of the particles, and a powdered, solid, water-soluble alkali-metal compound which releases a gas when reacted in water solutions with said treated phosphate glass, said water treating composition being characterized by a high rate of solution in water.

10. A water treating composition consisting essentially of a sodium phosphate glass having a molar ratio of sodium oxide to phosphorus pentoxide between about 0.9:1 and about 1.7:1, the particles of said glass having on their surfaces an acidic reversion product of the character obtainable by hydrating the surfaces of the sodium phosphate glass at a temperature of from about 20° C. to about 150° C. until an amount of moisture equivalent in weight to about 0.5 to about 6.0 per cent of the weight of the phosphate glass has been absorbed thereon, and then partially dehydrating the partially hydrated particles by subjecting them to substantially moisture-free air at a temperature of about 70° C. to about 500° C. until the moisture remaining constitutes from about 0.05 to about 2.5 per cent of the weight of the particles, and a powdered carbonate of sodium which releases a gas when reacted in water solutions with said treated phosphate glass, said water treating composition being characterized by a high rate of solution in water.

11. A water treating composition consisting essentially of a sodium phosphate glass having a molar ratio of sodium oxide to phosphorus pentoxide between about 0.9:1 and about 1.7:1, the particles of said glass having on their surfaces an acidic reversion product of the character obtainable by hydrating the surfaces of the sodium phosphate glass at a temperature of from about 20° C. to about 150° C. until an amount of moisture equivalent in weight to about 0.5 to about 6.0 per cent of the weight of the phosphate glass has been absorbed thereon, and then partially dehydrating the partially hydrated particles by subjecting them to substantially moisture-free air at a temperature of about 70° C. to about 500° C. until the moisture remaining constitutes from about 0.05 to about 2.5 per cent of the weight of the particles, and a powdered sulfite of sodium which releases a gas when reacted in water solutions with said treated phosphate glass, said water treating composition being characterized by a high rate of solution in water.

12. A water treating composition consisting essentially of a powdered, water-soluble alkali-metal phosphate glass having a molar ratio of alkali-metal to phosphorus pentoxide between about 0.9:1 and about 1.7:1, the particles of said glass having on their surfaces an acidic reversion product of the character obtainable by hydrating the surfaces of the alkali-metal phosphate glass at a temperature of from about 20° C. to about 150° C. until an amount of moisture equivalent in weight to about 0.5 to about 6.0 per cent of the weight of the phosphate glass has been absorbed thereon, and then partially dehydrating the partially hydrated particles by subjecting them to substantially moisture-free air at a temperature of about 70° C. to about 500° C. until the moisture remaining constitutes from about 0.05 to about 2.5 per cent of the weight of the particles, and a powdered, solid, water-soluble alkali-metal compound which releases a gas when reacted in water solutions with said treated phosphate glass, said water treating composition being characterized by a high rate of solution in water.

13. The process of treating a powdered, water-soluble alkali-metal phosphate glass having a molar ratio of alkali-metal oxide to phosphorus pentoxide between about 0.9:1 and about 1.7:1 to produce a water treating composition having a high rate of solution in water, which comprises hydrating the surfaces of the said alkali-metal phosphate glass at a temperature of about 60° C. for such a time that there is accumulated upon the alkali-metal phosphate glass from about 0.5 to about 6.0 per cent of water by weight, subjecting the alkali-metal phosphate glass to air substantially free of moisture at a temperature within the range of from about 70° C. to about 500° C. for such a period of time that the alkali-metal phosphate glass contains from about 0.05 to about 2.5 per cent by weight of moisture, and mixing with the said alkali-metal phosphate glass a powdered solid water-soluble alkali-metal compound which releases a gas when the resultant mixture is added to water.

14. The process of treating a powdered, water-soluble alkali-metal phosphate glass having a molar ratio of alkali-metal oxide to phosphorus pentoxide between about 0.9:1 and about 1.7:1 to produce a water treating composition having a high rate of solution in water, which comprises hydrating the surfaces of the said alkali-metal phosphate glass at a temperature of about 60° C. for such a time that there is accumulated upon the alkali-metal phosphate glass about 4.0 per cent of water by weight, subjecting the alkali-metal phosphate glass to air substantially free of moisture at a temperature within the range of from about 100° C. to about 150° C. for such a period of time that the alkali-metal phosphate glass contains from about 0.75 per cent to about 1.0 per cent by weight of moisture, and mixing with the said alkali-metal phosphate glass a powdered solid water-soluble alkali-metal compound which releases a gas when the resultant mixture is added to water.

15. A water treating composition consisting essentially of a powdered, water-soluble alkali-metal phosphate glass having a molar ratio of alkali-metal to phosphorus pentoxide between 0.9:1 and about 1.7:1, the particles of said glass having on their surfaces an acidic reversion product of the character obtainable by hydrating the surfaces of the alkali-metal phosphate at a temperature of from about 20° C. to about 150° C. until an amount of moisture equivalent in weight to about 0.5 to about 6.0 per cent of the weight of the phosphate glass has been absorbed thereon, and then partially dehydrating the partially hydrated particles by subjecting them to substantially moisture-free air at a temperature of about 100° C. to about 500° C. until the moisture remaining constitutes from about 0.05 to 2.5 per cent of the weight of the particles, said particles having a bulk of at least 35 cubic inches per pound.

16. A water treating composition consisting essentially of a powdered, water-soluble alkali-metal phosphate glass having a molar ratio of alkali-metal to phosphorus pentoxide between 0.9:1 and about 1.7:1, the particles of said glass having on their surfaces an acidic reversion product of the character obtainable by hydrating the surfaces of the alkali-metal phosphate at a temperature of from about 20° C. to about 150° C. until an amount of moisture equivalent in weight to about 0.5 to about 6.0 per cent of the weight of the phosphate glass has been absorbed thereon, and then partially dehydrating the partially hydrated particles by subjecting them to substantially moisture-free air at a temperature of about 100° C. to about 500° C. until the moisture remaining constitutes from about 0.05 to 2.5 per cent of the weight of the particles, said particles having a bulk approximately twice that of the unprocessed powdered glass.

CASIMIR J. MUNTER.

REFERENCES CITED

The following references are of record in the file of this patent:

UNITED STATES PATENTS

| Number | Name | Date |
| --- | --- | --- |
| 1,037,078 | Strickler | Aug. 27, 1912 |
| 1,979,926 | Zinn | Nov. 6, 1934 |
| 2,008,651 | Zinn | July 16, 1934 |
| 2,244,158 | Hubbard | June 3, 1941 |

Certificate of Correction

Patent No. 2,494,828

January 17, 1950

CASIMIR J. MUNTER

It is hereby certified that errors appear in the printed specification of the above numbered patent requiring correction as follows:

Column 2, line 16, for "suih" read *such*; column 6, line 27, for "sinces" read *since*; column 8, line 59, after the word "acid" insert *reversion*; column 18, line 40, list of references cited, for "July 16, 1934" read *July 16, 1935*; line 41, for "Hubbard" read *Hubbard et al.*;

and that the said Letters Patent should be read with these corrections therein that the same may conform to the record of the case in the Patent Office.

Signed and sealed this 23rd day of May, A. D. 1950.

[SEAL]

THOMAS F. MURPHY,
*Assistant Commissioner of Patents.*